(12) United States Patent
Okabe et al.

(10) Patent No.: US 9,132,702 B2
(45) Date of Patent: Sep. 15, 2015

(54) HEAVY DUTY PNEUMATIC TIRE

(71) Applicant: SUMITOMO RUBBER INDUSTRIES, LTD., Kobe-shi, Hyogo (JP)

(72) Inventors: Taro Okabe, Kobe (JP); Satoshi Tanaka, Kobe (JP); Ikuo Atake, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/150,794

(22) Filed: Jan. 9, 2014

(65) Prior Publication Data

US 2014/0224398 A1    Aug. 14, 2014

(30) Foreign Application Priority Data

Feb. 14, 2013    (JP) ................. 2013-026982

(51) Int. Cl.
*B60C 11/12* (2006.01)
*B60C 11/03* (2006.01)
*B60C 11/13* (2006.01)

(52) U.S. Cl.
CPC ........... *B60C 11/0306* (2013.04); *B60C 11/125* (2013.04); *B60C 11/1259* (2013.04); *B60C 11/1263* (2013.04); *B60C 11/1369* (2013.04); *B60C 2011/0346* (2013.04); *B60C 2011/0369* (2013.04); *B60C 2011/0379* (2013.04); *B60C 2200/06* (2013.04)

(58) Field of Classification Search
CPC  B60C 11/0306; B60C 11/0309; B60C 11/12; B60C 11/125; B60C 11/1204; B60C 11/1209; B60C 11/1218; B60C 11/1259; B60C 11/1263; B60C 11/1353; B60C 11/1369; B60C 2011/0358; B60C 2011/0362; B60C 2011/0367; B60C 2011/0369; B60C 2011/0374; B60C 2011/0379; B60C 2200/06
USPC ........................ 152/209.18, 209.25
See application file for complete search history.

(56) References Cited

U.S. PATENT DOCUMENTS

| | | | | |
|---|---|---|---|---|
| 4,303,115 | A * | 12/1981 | Flechtner et al. | 152/209.17 |
| 5,909,756 | A * | 6/1999 | Miyazaki | 152/209.18 |
| 2006/0254684 | A1 * | 11/2006 | Tamura | 152/209.18 |
| 2007/0151643 | A1 * | 7/2007 | Takahashi | 152/209.1 |
| 2013/0160909 | A1 * | 6/2013 | Atake | 152/209.25 |
| 2014/0130950 | A1 * | 5/2014 | Guichon | 152/209.18 |

FOREIGN PATENT DOCUMENTS

| | | |
|---|---|---|
| JP | 2006-341769 A | 12/2006 |
| JP | 2012-228981 | * 11/2012 |

\* cited by examiner

*Primary Examiner* — Eric Hug
(74) *Attorney, Agent, or Firm* — Birch, Stewart, Kolasch & Birch, LLP

(57) ABSTRACT

A heavy duty pneumatic tire includes a tread portion provided with a pair of shoulder main grooves disposed axially outermost side, and at a center main groove between the shoulder main grooves to form a pair of middle portions. Each middle portion is provided with a middle sub groove, axially outer middle lateral grooves, and inner middle lateral grooves. The respective number of outer and inner middle lateral grooves are of from 40 to 50 in each middle portion. Each of the outer and inner middle lateral grooves includes a shallow bottom part having a depth smaller than that of the shoulder and center main grooves. The shallow bottom part is provided with a groove bottom sipe that extends along a longitudinal direction of each lateral grooves and includes a first portion, and a second portion having a depth smaller than the first portion.

5 Claims, 7 Drawing Sheets

HEAVY DUTY PNEUMATIC TIRE

BACKGROUND OF THE INVENTION

1. Field of the Invention

The present invention relates to a heavy duty pneumatic tire that offers low rolling resistance while maintaining wet performance as well as anti-stone-biting performance.

2. Description of the Related Art

A pneumatic tire having low rolling resistance is recently proposed. Japanese Unexamined Patent Application Publication No. 2006-341769 discloses a pneumatic tire having a tread portion with a high land ratio in its central region for reducing energy loss of tread rubber by preventing large deformation of the central region.

However, such a pneumatic tire tends to have disadvantage of low wet performance. Furthermore, such a pneumatic tire tends to bite a stone in its grooves and hold it in long term.

SUMMARY OF THE INVENTION

The present invention has been worked out in light of the circumstances described above, and has a main object of providing a heavy duty pneumatic tire that offers low rolling resistance while maintaining wet performance as well as anti-stone-biting performance.

According to one aspect of the present invention, a heavy duty pneumatic tire includes a tread portion provided with a plurality of circumferentially and continuously extending main grooves that include a pair of shoulder main grooves disposed axially outermost side, and at least one center main groove disposed between the shoulder main grooves, and the tread portion including a pair of middle portions each of which is between the shoulder main groove and the center main groove. Each middle portion is provided with a circumferentially and continuously extending middle sub groove, a plurality of axially outer middle lateral grooves extending from the middle sub groove to the shoulder main groove, and a plurality of axially inner middle lateral grooves extending from the middle sub groove toward the center main groove. The outer middle lateral grooves and the inner middle lateral grooves are inclined at angle with respect to an axial direction of the tire with the same direction. The respective number of outer middle lateral grooves and the inner middle lateral grooves are in a range of from 40 to 50 in each middle portion. Each of the outer middle lateral grooves and the inner middle lateral grooves includes a shallow bottom part having a depth smaller than that of the shoulder main grooves and the center main groove. The shallow bottom part is provided with a groove bottom sipe extending along a longitudinal direction of each lateral groove, and the groove bottom sipe includes a first portion having a depth from a top surface of the middle portion to its bottom in a range of from 0.85 to 1.0 times in relation to a depth of the center main groove, and a second portion having a depth from a top surface of the shallow bottom part to its bottom in a range of from 0.30 to 0.70 times in relation to a depth from a top surface of the shallow bottom part to a bottom of the first portion.

In the aspect of the present invention, the middle sub groove may be configured to a zigzag form that includes a first inclined element and a second inclined element inclined an opposite direction with respect to the first inclined element and having a circumferential length longer than that of the first inclined element.

In the aspect of the present invention, the middle portion may include a plurality of outer middle blocks between the outer middle lateral grooves, and each outer middle block has a circumferential length in a range of from 0.50 to 0.80 times in relation to a maximum circumferential ground contact length of the tread portion under a standard loaded condition in which the tire is mounted on a standard wheel rim with a standard pressure and is loaded with a standard tire load at a camber angle of zero.

In the aspect of the present invention, the first portion of the groove bottom sipe may have a longitudinal length in a range of from 0.20 to 0.40 times the whole length of the groove bottom sipe.

In the aspect of the present invention, the groove bottom sipe may include the first portion and second portion alternately arranged in a circumferential direction of the tire.

DETAILED DESCRIPTION

An embodiment of the present invention will be explained below with reference to the accompanying drawings.

Figure 1:
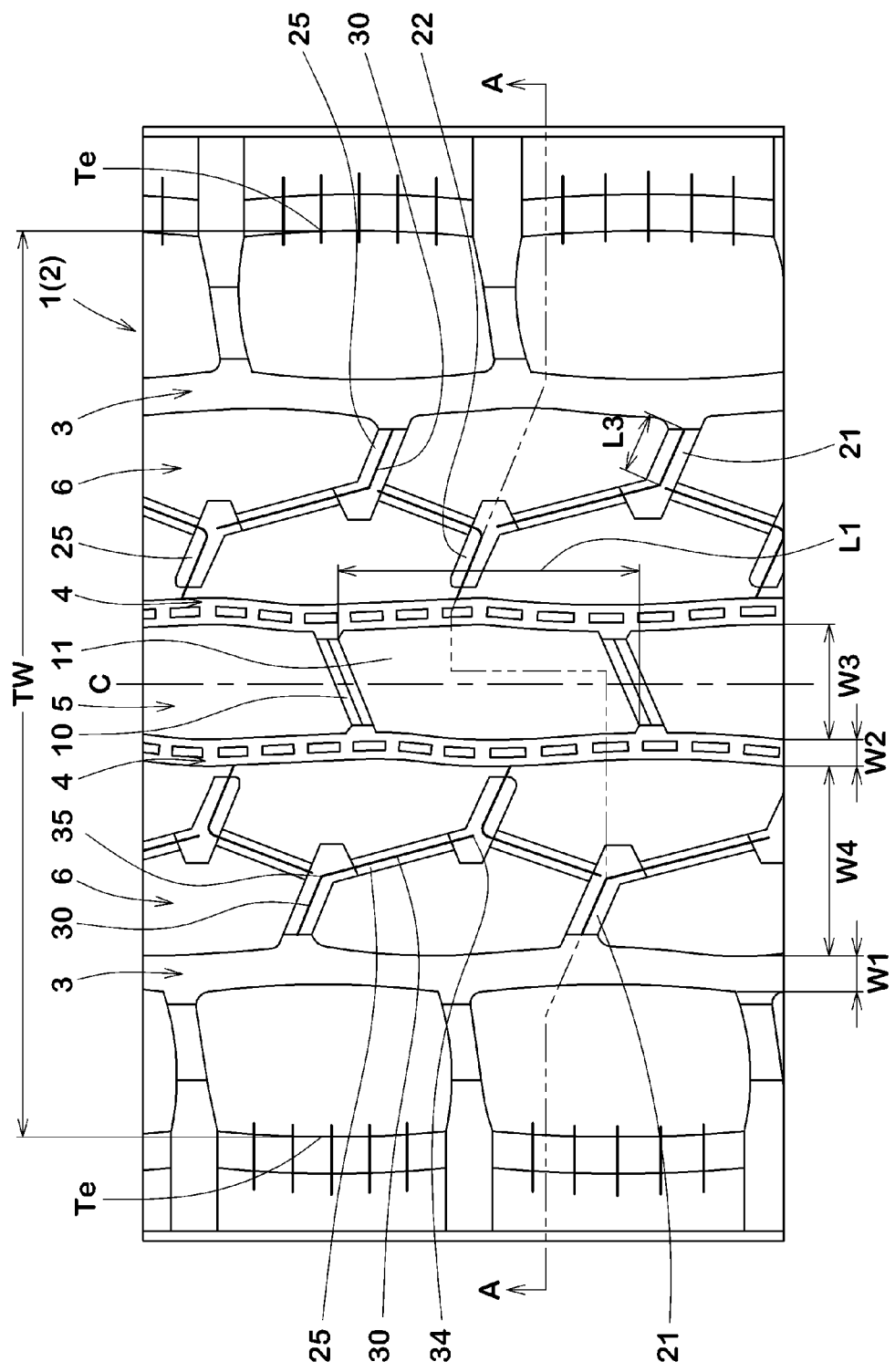
FIG. 1 is a development view of a tread portion of a heavy duty pneumatic tire showing an embodiment of the present invention.

As shown in FIG. 1, a heavy duty pneumatic tire 1 for trucks or busses in accordance with the present invention comprises a tread portion 2 provided with a plurality of circumferentially and continuously extending main grooves that include a pair of shoulder main grooves 3 and 3 disposed axially outermost side and at least one, preferably a pair of center main grooves 4 and 4 disposed between the shoulder main grooves 3 and 3. Thus, the tread portion 2 is separated into a plurality of land portions that include a central portion 5 between the center main grooves 4 and 4, and a pair of middle portions 6 and 6 between adjacent center main groove 3 and shoulder main groove 4.

Figure 2:
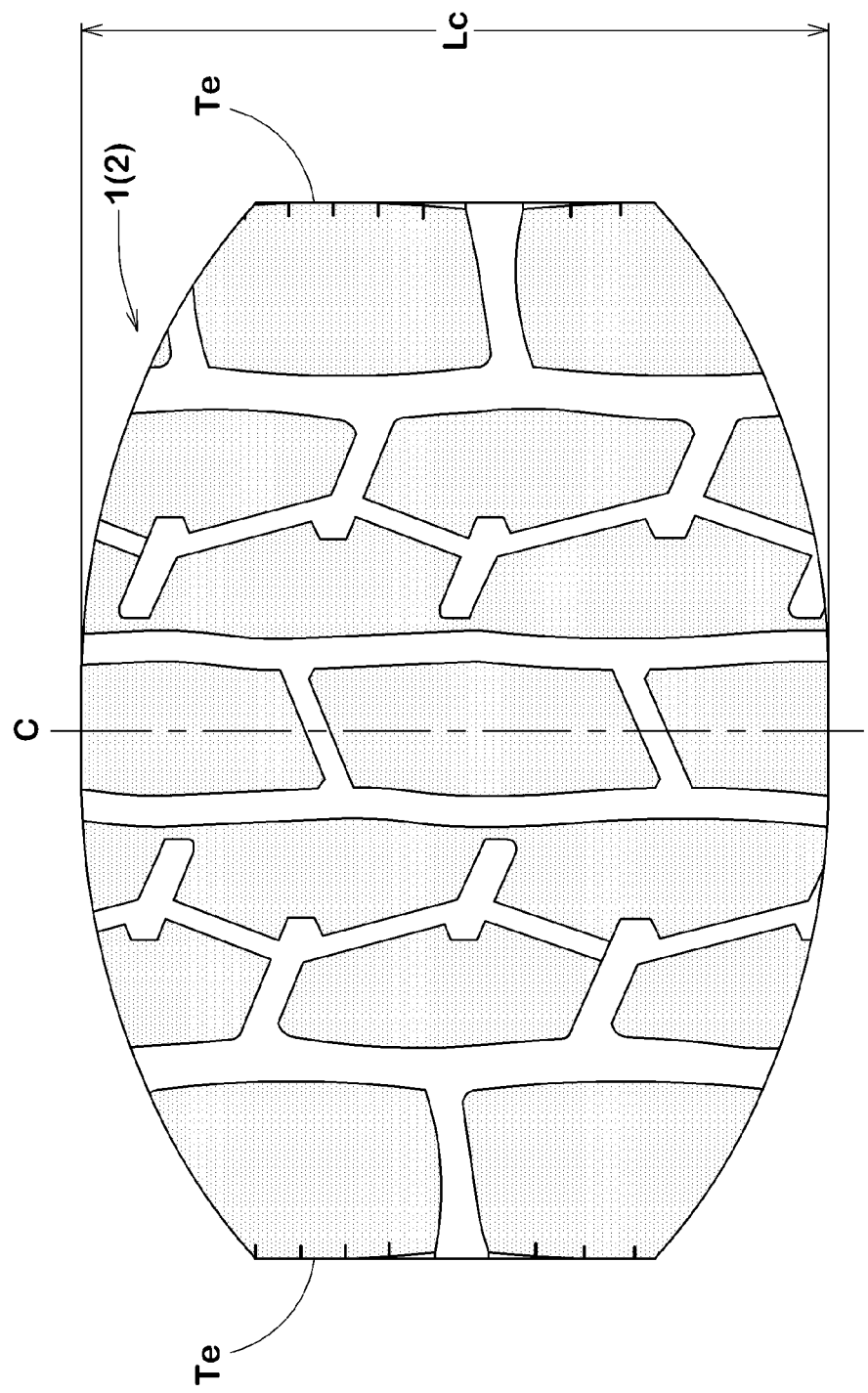
FIG. 2 is a ground contact patch of the tire shown in FIG. 1.

As shown in FIG. 2, the tread portion 2 includes a pair of tread edges Te and Te. The tread edge Te is defined as an axially outer edge in a ground contact patch of the tread portion under a standard loaded condition in which the tire 1 is mounted on a standard wheel rim with a standard pressure and is loaded with a standard tire load at a camber angle of set to zero. A tread width TW shown in FIG. 1 is an axial distance between the tread edges Te and Te under a standard unloaded condition in which the tire 1 is mounted on the standard wheel rim with the standard pressure and is loaded with no tire load. In this application including specification and claims, various dimensions, positions and the like of the tire refer to those under the standard unloaded condition of the tire unless otherwise noted.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

Preferably, the tread portion 2 has a land ratio in a range of from 70% to 80%, more preferably in a range of from 75% to 80% in order to offer low rolling resistance of the tire due to its high tread pattern rigidity. Here, the land ratio of the tread portion 2 is a ratio of a net ground contact area to a gross total ground contact area on the tread portion.

In order to effectively drain the water from under the tread portion 2, each of the shoulder main grooves 3 and center main grooves 4 may be configured to a zigzag or straight form that continuously extends in the circumferential direction of the tire.

In order to further improve wet performance and steering stability of the tire, the shoulder main grooves 3 preferably have its groove widths W1 in a range of 3.0% to 4.0% the tread width TW, and the center main grooves 4 preferably have its groove widths W2 in a range of 2.0% to 3.0% the tread width TW.

Figure 3:
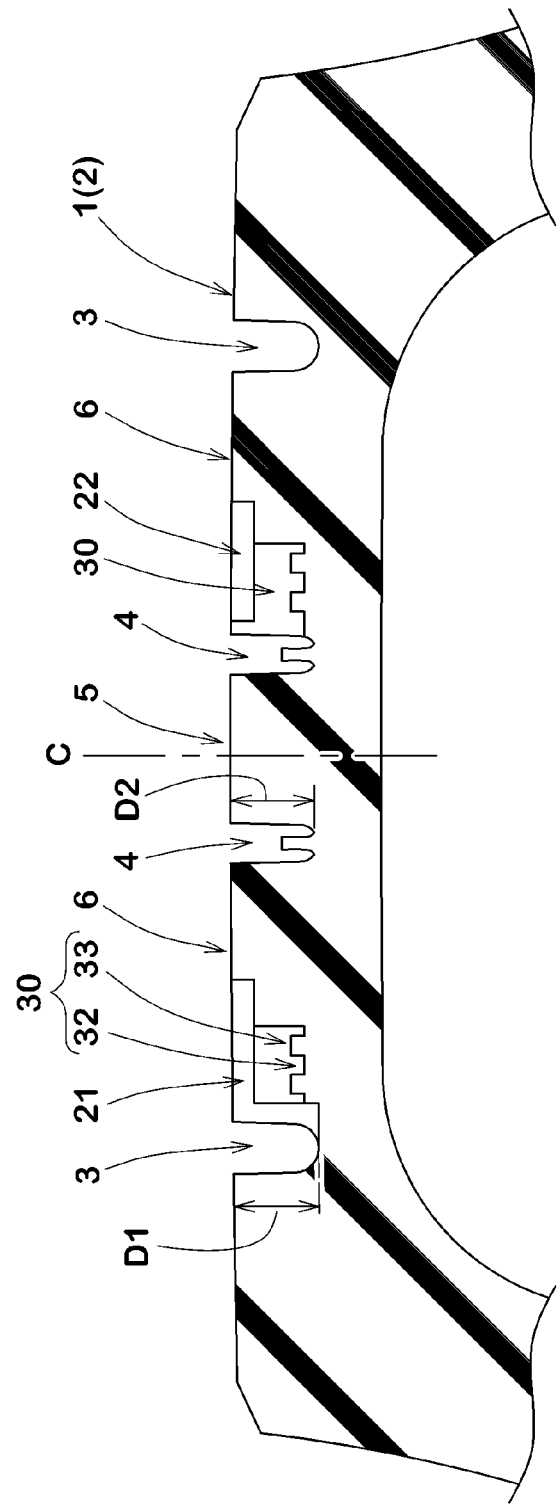
FIG. 3 is a cross sectional view of the tread portion taken along a line A-A in FIG. 1.

FIG. 3 shows a cross sectional view of the tread portion 2 taken along the line A-A of FIG. 1. Referring to FIG. 3, the shoulder main grooves 3 and center main grooves 4 preferably have the respective groove depths D1 and D2 in a range of from 12 to 20 mm.

Referring back to FIG. 1, the central portion 5 is provided with a plurality of center lateral grooves 10 that have both ends communicated with center main grooves 4 and 4. In this embodiment, each center lateral groove 10 has a constant groove width and is inclined at an angle with respect to the axial direction of the tire. The center portion 5 is divided into a plurality of center blocks 11.

Each center block 11 has a circumferentially long rectangular top surface that comes into contact with the road. The top surface of the center block 11 preferably has the maximum axial width W3 in a range of not less than 0.10 times, more preferably not less than 0.13 times, but preferably not more than 0.20 times, more preferably not more than 0.17 times the tread width TW. Since the center blocks 5 enhances pattern rigidity in the central portion 5, low rolling resistance may be provided.

In order to offer superior wet performance and low rolling resistance of the tire, the top surface of the center block 11 preferably has its circumferential length L1 in a range of not less than 0.50 times, more preferably not less than 0.60 times, but preferably not more than 0.80 times, more preferably not more than 0.70 times in relation to a maximum circumferentially ground contact length Lc (shown in FIG. 2) of the tread portion 2, under the standard loaded condition.

Figure 4:
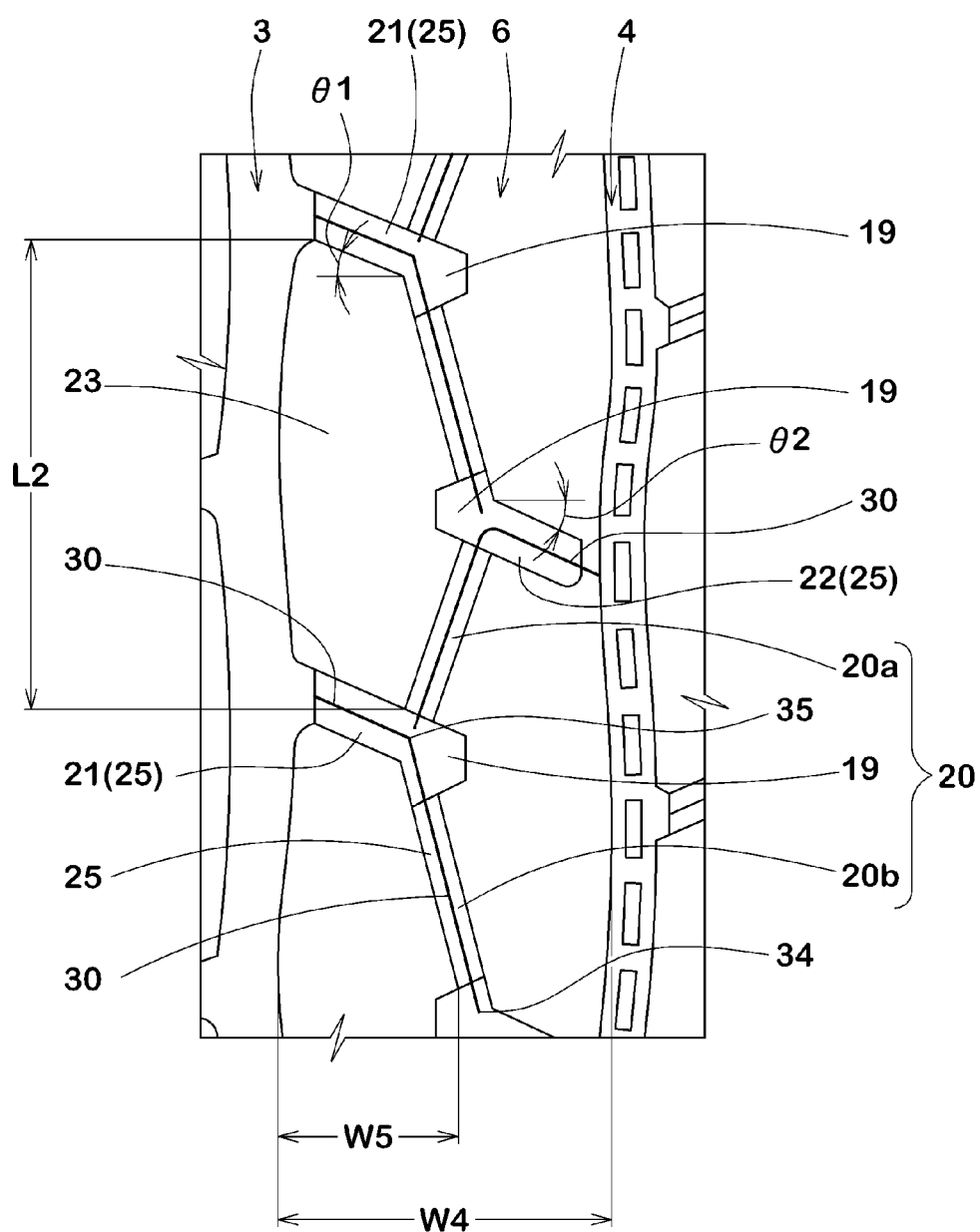
FIG. 4 is a partial enlarged view of a middle portion of the tread portion shown in FIG. 1.

FIG. 4 shows a partial enlarged view of the middle portion 6. Referring to FIG. 4, the middle portion 6 is provided with a circumferentially and continuously extending middle sub groove 20, a plurality of outer middle lateral grooves 21, and a plurality of inner middle lateral grooves 22.

The middle sub groove 20 is configured to a zigzag form that includes a first inclined element 20a and a second inclined element 20b inclined an opposite direction with respect to the first inclined element 20a. Furthermore, the middle sub groove 20 includes width-expanded portions 19 between the first inclined element 20a and the second inclined element 20b. The width-expanded portions 19 have locally wide axial widths in order to improve wet performance of the tire.

The second inclined element 20b preferably has a circumferential length longer than that of the first inclined element 20a. Thus, since resonance of noise generated from the respective first and second inclined elements 20a and 20b may be prevented, noise performance of the tire may be improved.

Each outer middle lateral groove 21 extends from the middle sub groove 20 to the shoulder main groove 3 with an inclination with respect to the axial direction of the tire. The outer middle lateral groove 21 has an axially inner end communicated with the width-expanded portion 19 of the middle sub groove 20, whereby the water in the width-expanded portion 19 effectively dispersed through the outer middle lateral groove 21 and the shoulder main groove 3 so that wet performance may be further improved. In this embodiment, the axially outer middle lateral groove 21 has a constant groove width.

In order to further improve drainage performance as well as cornering performance on wet roads, the outer middle lateral groove 21 preferably has an angle $\theta 1$ in a range of not less than 20 degrees, more preferably not less than 24 degrees, but preferably not more than 30 degrees, more preferably not more than 26 degrees with respect to the radial direction of the tire.

Each inner middle lateral groove 22 extends from the middle sub groove 20 toward the center main groove 4. The inner middle lateral groove 22 has an axially outer end communicated with the width-expanded portion 19 of the middle sub groove 20.

The inner middle lateral groove 22 has an axially inner end that terminates within the middle portion 6 without reaching the center main groove 4. Accordingly, noise performance of the tire may be improved, since resonance noise generated in the center main groove 4 may not be dispersed through the inner middle lateral grooves 22.

The inner middle lateral grooves 22 are inclined at an angle with respect to the axial direction of the tire with the same direction to the outer middle lateral grooves 21. In this embodiment, the inner middle lateral grooves 22 have constant groove width. In order to further improve drainage performance as well as cornering performance on wet roads, each inner middle lateral groove 22 preferably has an angle $\theta 2$ in a range of not less than 20 degrees, more preferably not less than 24 degrees, but preferably not more than 30 degrees, more preferably not more than 26 degrees with respect to the radial direction of the tire.

In the respective middle portions 6, the number of outer middle lateral grooves 21 is in a range of from 40 to 50, more preferably from 42 to 48. Similarly, in the respective middle portions 6, the number of inner middle lateral grooves 22 is in a range of from 40 to 50, more preferably from 42 to 48. Such a tire having few middle lateral grooves as compared to the conventional one may help to improve rigidity of the tread pattern and reduce biting a stone in its inner and outer middle lateral grooves.

The respective middle portions 6 include a plurality of axially outer middle blocks 23 each of which is divided among the shoulder main groove 3, adjacent outer middle lateral grooves 21 and 21, and the middle sub groove 20.

In order to further improve wet performance as well as low rolling resistance of the tire, each outer middle block 23 preferably has its circumferential length L2 in a range of not less than 0.50 times, more preferably not less than 0.55 times, but preferably not more than 0.80 times, more preferably not more than 0.75 times, in relation to the maximum circumferential ground contact length Lc of the tread portion 2 as shown in FIG. 2. The maximum circumferential ground contact length Lc is measured under the standard loaded condition defined above.

In the same point of view, the outer middle block 23 preferably has its axial width W5 in a range of not less than 0.10 times, more preferably not less than 0.13 times, but preferably not more than 0.20 times, more preferably not more than 0.17 times in relation to the tread width TW (shown in FIG. 1).

Each of the outer middle lateral grooves 21 and the inner middle lateral grooves 22 include a shallow bottom part 25 having a depth smaller than that of the shoulder main grooves 3 and the center main groove 4 so that the middle portion 6 may have high rigidity. Thus, deformation of the middle portion 6 during traveling may be reduced, thereby decreasing rolling resistance of the tire.

Figure 5:
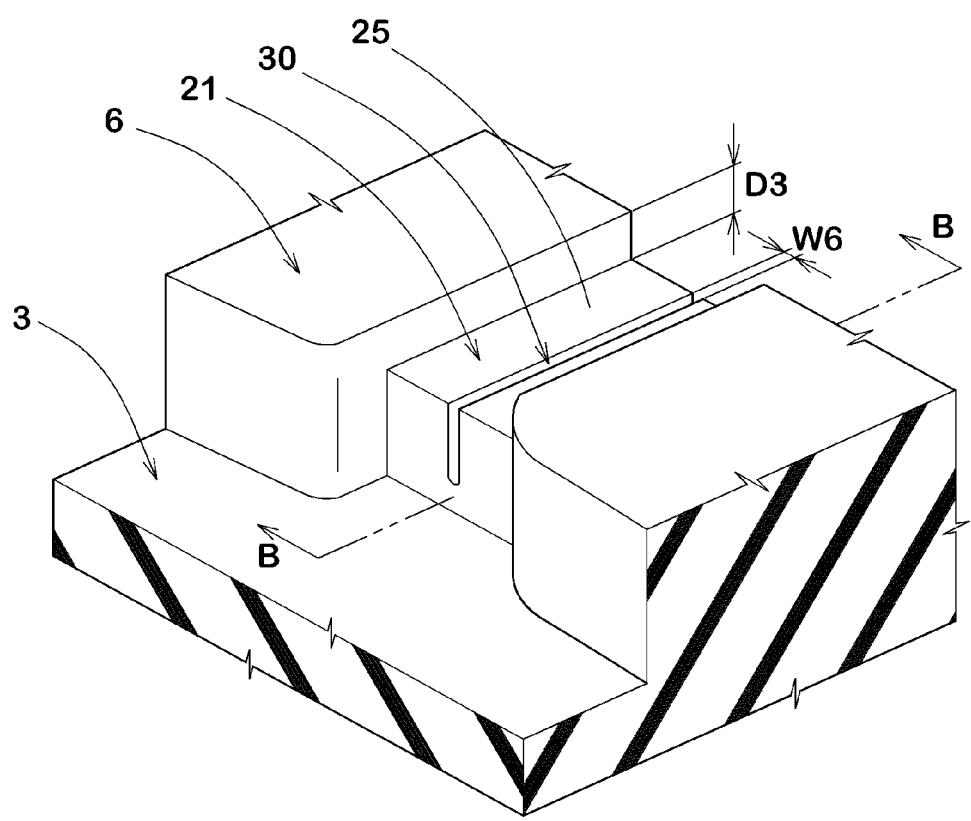
FIG. 5 is a perspective view of an outer middle lateral groove shown in FIG. 4.

FIG. 5 shows a perspective view of the outer middle lateral groove 21. Referring to FIG. 5, the shallow bottom part 25 preferably has a depth D3 in a range of not less than 0.10 times, more preferably not less than 0.13 times, but preferably not more than 0.20 times, more preferably not more than 0.17 times, in order further improve rolling resistance while maintaining wet performance of the tire.

The shallow bottom part 25 is disposed a groove bottom sipe 30 that straightly extends along a longitudinal direction of each lateral groove 21 and 22, for example. Such a groove bottom sipe 30 may help to improve drainage performance of the tire. Preferably, the groove bottom sipe 30 is provided in a center region in relation to a groove width direction of the shallow bottom part 25.

In order to further improve drainage performance and rolling resistance of the tire, the groove bottom sipe 30 preferably has a width W6 in a range of from not less than 0.3 mm, more preferably not less than 0.5 mm, but preferably not more than 1.0 mm, more preferably not more than 0.8 mm.

Figure 6:
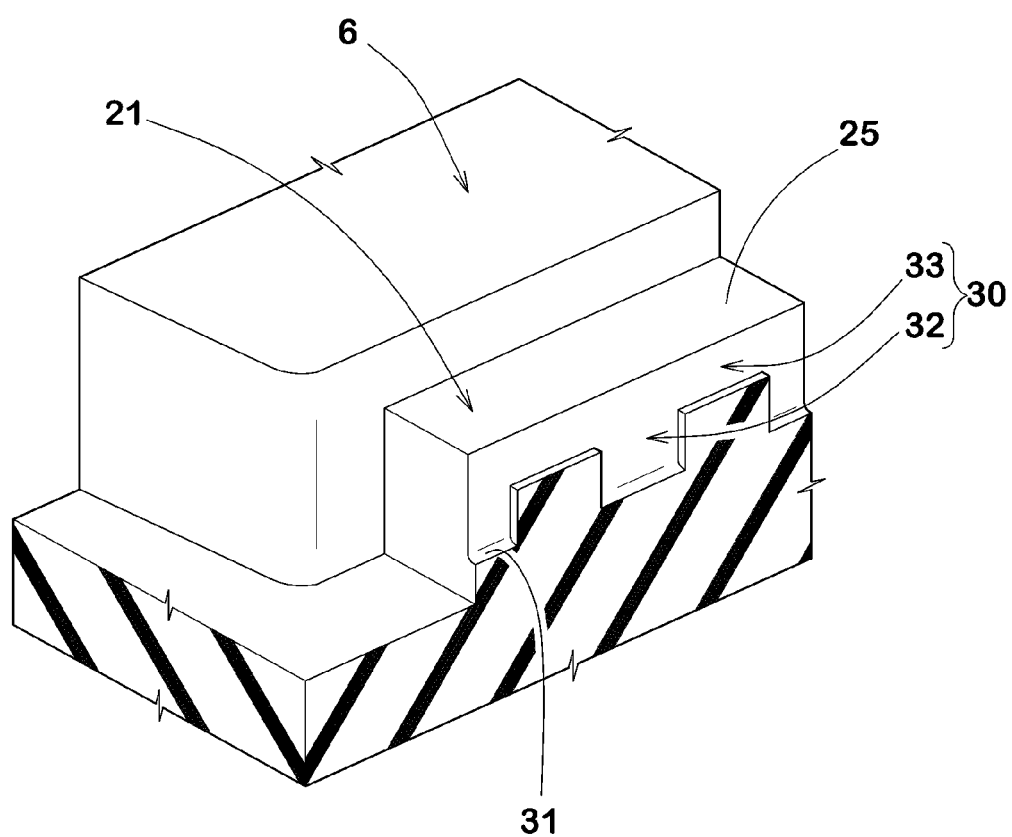
FIG. 6 is a perspective view of the outer middle lateral groove including a cross section B-B in FIG. 5.

FIG. 6 shows a perspective view of the outer middle lateral groove 21 including a cross section B-B in FIG. 5. Referring to FIG. 6, the groove bottom sipe 30 has a bottom 31 that includes different depths along the sipe longitudinal direction. In this embodiment, the groove bottom sipe 30 includes a first portion 32 and a second portion 33 having a depth smaller than that of the first portion 32.

Figure 7:
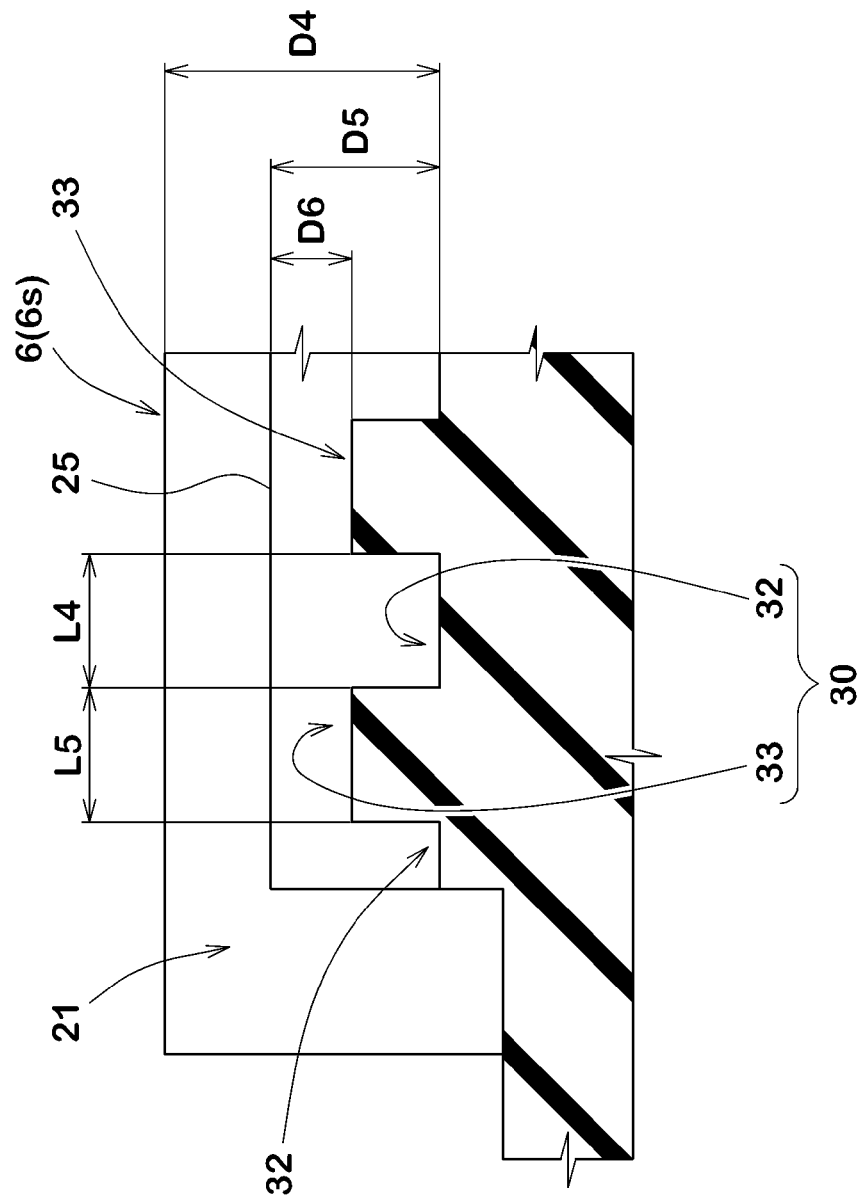
FIG. 7 is a cross sectional view taken along a line B-B in FIG. 5.

FIG. 7 shows a cross sectional view taken along a line B-B in FIG. 5. Referring to FIG. 7, the first portion 32 of the groove bottom sipe 30 has a depth D4 from the top surface 6s of the middle portion 6 to its bottom. In order to improve drainage performance of the outer middle lateral grooves 21, the depth D4 of the first portion 32 of the groove bottom sipe 30 is preferably set in a range of from 0.85 to 1.0 times in relation to the depth D2 (shown in FIG. 3) of the center main groove 4.

In case that the depth D4 of the first portion 32 is more than 1.0 times in relation to the depth D2 of the center main groove 4, the middle portion 6 tends to have low rigidity, thereby increasing rolling resistance of the tire. In case that the depth D4 of the first portion 32 is less than 0.85 times in relation to the depth D2 of the center main groove 4, drainage performance of the outer middle lateral groove 21 tends to deteriorate. Preferably, the depth D4 of the first portion 32 is set in a range of not more than 0.98 times, more preferably not more than 0.95 times, but preferably not less than 0.88 times, more preferably not less than 0.90 times, in relation to the depth D2 of the center main groove 4.

The second portion 33 of the groove bottom sipe 30 has a depth D6 from the top surface of the shallow bottom part 25 to its bottom. In order to improve drainage performance of the outer middle lateral grooves 21 while offering suitable rigidity in the middle portion 6 for improving anti-stone-biting performance, the depth D6 of the second portion 33 is preferably set in a range of from 0.30 to 0.70 times in relation to a depth D5 from the top surface of the shallow bottom part 25 to the bottom of the first portion 32. Furthermore, such a second portion 33 may help to reduce the amount of deformation on the outer middle lateral groove, thereby reducing rolling resistance of the tire.

In case that the depth D6 of the second portion 33 is more than 0.70 times in relation to the depth D5 of the first portion 32 above, the relatively large deformation during traveling may be caused around the outer middle lateral groove 21. In case that the depth D6 of the second portion 33 is less than 0.30 times in relation to the depth D5 of the first portion 32 above, drainage performance of the outer middle lateral groove 21 tends to deteriorate. Preferably, the depth D6 of the second portion 33 is set in a range of not more than 0.60 times, more preferably not more than 0.55 times, but preferably not less than 0.40 times, more preferably not less than 0.35 times, in relation to the depth D5 of the first portion 32.

Preferably, the first portion 21 and second portion 33 are alternately arranged in a longitudinal direction of the groove bottom sipe 30. Thus, the groove bottom sipe 30 may have the bottom enhanced in well balanced along the longitudinal direction of the sipe so that deformation on the middle portion 6 during traveling is reduced.

Preferably, the respective longitudinal lengths L4 and L5 of the first portion 32 and the second portion 33 are set in a range of not less than 0.20 times, more preferably not less than 0.25 times, but preferably not more than 0.40 times, more preferably not more than 0.35 times, in relation to a longitudinal length L3 (shown in FIG. 1) of the groove bottom sipe 30.

As shown in FIG. 4, the shallow bottom part 25 and the groove bottom sipe 30 may be disposed on the middle sub groove 20. Thus, wet performance as well as low rolling resistance may further be improved.

In order to maintain steering stability of the tire by preventing reduction in rigidity of the middle portion 6, the groove bottom sipe 30 on the middle sub groove 20 preferably has one end that is connected with the groove bottom sipe 30 extending on the outer or inner middle lateral groove 21 or 22, and the other end that terminates within the middle sub groove 20 without connecting any other sipe.

The present invention is more specifically described and explained by means of the following Examples and References. It is to be understood that the present invention is not limited to these Examples and embodiments described above.

Comparison Test

Heavy duty pneumatic tires shown in FIG. 1 and Table 1 were made and tested with respect to rolling resistance, wet performance and anti stone-biting performance. Major common specifics of tires and test methods are as follows.

Details of test tires:
 Size: 275/80R22.5
 Rim: 22.5×7.5
 Internal pressure: 900 kPa
 Tread width TW: 248 mm
 Shoulder main groove width W1: 10 mm
 Shoulder main groove depth D1: 16 mm
 Center main groove width W2: 6 mm
 Center main groove depth D2: 16 mm Rolling resistance test:

Rolling resistance of each test tire was measured under the following condition, using a tester. The test results were evaluated as the reciprocal of the rolling resistance and were indicated using an index based on Ref.1 being 100 in Table 1. The larger the index, the better the rolling resistance is.

Tire load: 33.83 kN
Speed: 80 km/h

Wet performance test:

The test tires were installed in a 2-D truck with a half load to its carrying capacity 10 tons, as its whole wheels. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ref.1 being 100 in Table 1. The larger the index, the better the wet performance is.

Anti stone-biting performance test:

The test tires were installed in the truck above with a full load to its carrying capacity 10 tons, as its whole wheels. After 100 m running on a gravel road, the whole weight of stones bitten in the shoulder and center main grooves was measured. The test results were evaluated as the reciprocal of the whole weight of the stones and were indicated using an index based on Ref.1 being 100 in Table 1. The larger the index, the better the anti stone-biting performance is.

Test results are shown in Table 1. From the test results, it was confirmed that Example tires in accordance with the present invention can be effectively improved rolling performance while maintaining wet road performance and anti stone-biting performance.

TABLE 1

|  | Ref. 1 | Ref. 2 | Ex. 1 | Ex. 2 | Ex. 3 | Ex. 4 | Ex. 5 | Ex. 6 | Ref. 3 | Ex. 7 | Ex. 8 | Ref. 4 |
|---|---|---|---|---|---|---|---|---|---|---|---|---|
| Land ratio (%) | 78 | 78 | 78 | 65 | 70 | 75 | 80 | 85 | 78 | 78 | 78 | 78 |
| Number of outer middle lateral groove in each middle portion | 45 | 45 | 45 | 45 | 45 | 45 | 45 | 45 | 45 | 45 | 45 | 45 |
| Number of inner middle lateral groove in each middle portion | 45 | 45 | 45 | 45 | 45 | 45 | 45 | 45 | 45 | 45 | 45 | 45 |
| Outer middle block length L2/Lc | 0.65 | 0.65 | 0.65 | 0.65 | 0.65 | 0.65 | 0.65 | 0.65 | 0.65 | 0.65 | 0.65 | 0.65 |
| Outer middle block width W5/TW | 0.15 | 0.15 | 0.15 | 0.15 | 0.15 | 0.15 | 0.15 | 0.15 | 0.15 | 0.15 | 0.15 | 0.15 |
| Shallow bottom part | Absence | Presence | Presence | Presence | Presence | Presence | Presence | Presence | Presence | Presence | Presence | Presence |
| Groove bottom sipe | Absence | Presence | Presence | Presence | Presence | Presence | Presence | Presence | Presence | Presence | Presence | Presence |
| Ratio L4/L3 | — | — | 0.25 | 0.25 | 0.25 | 0.25 | 0.25 | 0.25 | 0.25 | 0.25 | 0.25 | 0.25 |
| Ratio D4/D2 | — | — | 0.93 | 0.93 | 0.93 | 0.93 | 0.93 | 0.93 | 0.93 | 0.93 | 0.93 | 0.93 |
| Ratio D6/D5 | — | — | 0.65 | 0.65 | 0.65 | 0.65 | 0.65 | 0.65 | 0.5 | 0.6 | 0.7 | 0.8 |
| Rolling resistance (Index) | 100 | 100 | 110 | 105 | 108 | 110 | 110 | 110 | 110 | 110 | 110 | 110 |
| Wet performance (Index) | 100 | 100 | 110 | 110 | 110 | 110 | 110 | 105 | 105 | 108 | 108 | 108 |
| Anti stone-biting performance (Index) | 100 | 105 | 110 | 110 | 110 | 110 | 110 | 110 | 110 | 110 | 110 | 105 |

|  | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Land ratio (%) | 78 | 78 | 78 | 78 | 78 | 78 | 78 | 78 | 78 | 78 | 78 | 78 |
| Number of outer middle lateral groove in each middle portion | 38 | 40 | 42 | 48 | 50 | 52 | 45 | 45 | 45 | 45 | 45 | 45 |
| Number of inner middle lateral groove in each middle portion | 38 | 40 | 42 | 48 | 50 | 52 | 45 | 45 | 45 | 45 | 45 | 45 |
| Outer middle block length L2/Lc | 0.65 | 0.65 | 0.65 | 0.65 | 0.65 | 0.65 | 0.45 | 0.5 | 0.55 | 0.75 | 0.8 | 0.85 |
| Outer middle block width W5/TW | 0.15 | 0.15 | 0.15 | 0.15 | 0.15 | 0.15 | 0.15 | 0.15 | 0.15 | 0.15 | 0.15 | 0.15 |
| Shallow bottom part | Presence | Presence | Presence | Presence | Presence | Presence | Presence | Presence | Presence | Pres. | Pres. | Pres. |
| Groove bottom sipe | Presence | Presence | Presence | Presence | Presence | Presence | Presence | Presence | Presence | Presence | Presence | Presence |
| Ratio L4/L3 | 0.25 | 0.25 | 0.25 | 0.25 | 0.25 | 0.25 | 0.25 | 0.25 | 0.25 | 0.25 | 0.25 | 0.25 |
| Ratio D4/D2 | 0.93 | 0.93 | 0.93 | 0.93 | 0.93 | 0.93 | 0.93 | 0.93 | 0.93 | 0.93 | 0.93 | 0.93 |
| Ratio D6/D5 | 0.65 | 0.65 | 0.65 | 0.65 | 0.65 | 0.65 | 0.65 | 0.65 | 0.65 | 0.65 | 0.65 | 0.65 |
| Rolling resistance (Index) | 110 | 110 | 110 | 110 | 108 | 105 | 105 | 108 | 110 | 110 | 110 | 110 |
| Wet performance (Index) | 105 | 108 | 110 | 110 | 110 | 110 | 110 | 110 | 110 | 110 | 108 | 105 |
| Anti stone-biting performance (Index) | 110 | 110 | 110 | 110 | 110 | 110 | 110 | 110 | 110 | 110 | 110 | 110 |

|  | Ex. 21 | Ex. 22 | Ex. 23 | Ex. 24 | Ex. 25 | Ex. 26 | Ex. 27 | Ref. 5 | Ex. 28 | Ex. 29 |
|---|---|---|---|---|---|---|---|---|---|---|
| Land ratio (%) | 78 | 78 | 78 | 78 | 78 | 78 | 78 | 78 | 78 | 78 |
| Number of outer middle lateral groove in each middle portion | 45 | 45 | 45 | 45 | 45 | 45 | 45 | 45 | 45 | 45 |

TABLE 1-continued

| | | | | | | | | | | |
|---|---|---|---|---|---|---|---|---|---|---|
| Number of inner middle lateral groove in each middle portion | 45 | 45 | 45 | 45 | 45 | 45 | 45 | 45 | 45 | 45 |
| Outer middle block length L2/Lc | 0.65 | 0.65 | 0.65 | 0.65 | 0.65 | 0.65 | 0.65 | 0.65 | 0.65 | 0.65 |
| Outer middle block width W5/TW | 0.1 | 0.13 | 0.17 | 0.2 | 0.15 | 0.15 | 0.15 | 0.15 | 0.15 | 0.15 |
| Shallow bottom part | Presence | Presence | Presence | Presence | Presence | Presence | Presence | Presence | Presence | Presence |
| Groove bottom sipe | Presence | Presence | Presence | Presence | Presence | Presence | Presence | Presence | Presence | Presence |
| Ratio L4/L3 | 0.25 | 0.25 | 0.25 | 0.25 | 0.2 | 0.4 | 0.45 | 0.25 | 0.25 | 0.25 |
| Ratio D4/D2 | 0.93 | 0.93 | 0.93 | 0.93 | 0.93 | 0.93 | 0.93 | 0.6 | 0.85 | 1 |
| Ratio D6/D5 | 0.65 | 0.65 | 0.65 | 0.65 | 0.65 | 0.65 | 0.65 | 0.65 | 0.65 | 0.65 |
| Rolling resistance (Index) | 108 | 110 | 110 | 110 | 110 | 110 | 110 | 110 | 110 | 108 |
| Wet performance (Index) | 110 | 110 | 110 | 108 | 110 | 110 | 110 | 105 | 108 | 110 |
| Anti stone-biting performance (Index) | 110 | 110 | 110 | 110 | 107 | 107 | 105 | 110 | 110 | 110 |

What is claimed is:

1. A heavy duty pneumatic tire comprising
a tread portion provided with a plurality of circumferentially and continuously extending main grooves that include a pair of shoulder main grooves disposed axially outermost side, and at least one center main groove disposed between the shoulder main grooves, the tread portion including a pair of middle portions each of which is between the shoulder main groove and the center main groove,
each middle portion provided with a circumferentially and continuously extending middle sub groove, a plurality of axially outer middle lateral grooves extending from the middle sub groove to the shoulder main groove, and a plurality of axially inner middle lateral grooves extending from the middle sub groove toward the center main groove,
the outer middle lateral grooves and the inner middle lateral grooves inclined at angle with respect to an axial direction of the tire with the same direction, the respective number of outer middle lateral grooves and the inner middle lateral grooves being in a range of from 40 to 50 in each middle portion, each of the outer middle lateral grooves and the inner middle lateral grooves including a shallow bottom part having a depth smaller than that of the shoulder main grooves and the center main groove,
the shallow bottom part provided with a groove bottom sipe extending along a longitudinal direction of each lateral groove, and
the groove bottom sipe including a first portion and a second portion, the first portion having a depth from a top surface of the middle portion to its bottom in a range of from 0.85 to 1.0 times in relation to a depth of the center main groove, the second portion having a depth from a top surface of the shallow bottom part to its bottom in a range of from 0.30 to 0.70 times in relation to a depth from a top surface of the shallow bottom part to a bottom of the first portion.

2. The tire according to claim 1,
wherein the middle sub groove is configured to a zigzag form that includes a first inclined element and a second inclined element inclined an opposite direction with respect to the first inclined element and having a circumferential length longer than that of the first inclined element.

3. The tire according to claim 1,
wherein the middle portion includes a plurality of outer middle blocks between the outer middle lateral grooves, and
each outer middle block has a circumferential length in a range of from 0.50 to 0.80 times in relation to a maximum circumferential ground contact length of the tread portion under a standard loaded condition in which the tire is mounted on a standard wheel rim with a standard pressure and is loaded with a standard tire load at a camber angle of zero.

4. The tire according to claim 1,
wherein the first portion of the groove bottom sipe has a longitudinal length in a range of from 0.20 to 0.40 times the whole length of the groove bottom sipe.

5. The tire according to claim 1,
wherein the groove bottom sipe includes the first portion and second portion alternately arranged in a circumferential direction of the tire.

* * * * *